United States Patent [19]

Deger et al.

[11] Patent Number: 5,155,141
[45] Date of Patent: Oct. 13, 1992

[54] PROCESS FOR THE PRODUCTION OF FOAMS WITH THE AID OF BRANCHED DODECAFLUOROHEXANE

[75] Inventors: Hans-Matthias Deger, Hofheim am Taunus; Klaus J. Behme, Eppstein/Taunus; Claudia Schütz, Flörsheim am Main, all of Fed. Rep. of Germany

[73] Assignee: Hoechst Aktiengesellschaft, Frankfurt am Main, Fed. Rep. of Germany

[21] Appl. No.: 858,053

[22] Filed: Mar. 26, 1992

[30] Foreign Application Priority Data

Mar. 28, 1991 [DE] Fed. Rep. of Germany ....... 4110283

[51] Int. Cl.$^5$ ............................................... C08J 9/14
[52] U.S. Cl. ......................................... 521/131; 521/98
[58] Field of Search .................. 521/131, 133, 155, 98

[56] References Cited

U.S. PATENT DOCUMENTS 3,903,110 9/1975 Freyermuth ..................... 548/519
4,947,881 8/1990 Magid et al. ..................... 252/162

FOREIGN PATENT DOCUMENTS 0077964 5/1983 European Pat. Off. .
0334059 9/1989 European Pat. Off. .
1111381 7/1961 Fed. Rep. of Germany .
1209243 10/1970 United Kingdom .

OTHER PUBLICATIONS

*Kunststoff-Handbuch, Band VIII*:108,109; 453–455 and 507–510.
Uhlig, K., et al, "Polyurethane", In: *Ullmanns Encycl.*, vol. 19, 1980, pp. 301–341.
Kirk–Othmer, *Encycl. of Chem. Technology*, 3rd Ed., vol. 11, 1980, pp. 87–89 and vol. 23, 1983, pp. 576–607.
*Kunststoff-Handbuch, Band VII*:246–331.

Primary Examiner—Morton Foelak

[57] ABSTRACT

The invention relates to a process for the production of foams based on polyisocyanates by reaction of polyisocyanates, compounds having at least two hydrogen atoms which are reactive toward isocyanate groups, blowing agents and if appropriate other additives. A blowing agent which consists to the extent of at least 10 mol % of one or more branched dodecafluorohexanes is used here.

12 Claims, No Drawings

PROCESS FOR THE PRODUCTION OF FOAMS WITH THE AID OF BRANCHED DODECAFLUOROHEXANE

DESCRIPTION

The invention relates to a process for the production of foams based on polyisocyanates, in particular polyurethane foams and polyisocyanurate foams. The production of such foams is known and is described, for example, in Kunststoff-Handbuch (Plastics Handbook), Volume VII, Polyurethane (Polyurethanes), Carl Hanser Verlag Munich, Vienna (1983), pages 246 to 331, and in EP-A-0 077 964, EP-0 334 059 and DE-B 1 694 138 (=GB-B 1 209 243).

The raw materials which can be used and the possible processes for the production of rigid polyurethane foams are summarized in Ullmanns Enzyklopädie der technischen Chemie (Ullmann's Encyclopedia of Industrial Chemistry) 1980), Volume 19, pages 301 to 341.

Appropriate comments are furthermore to be found in Kirk-Othmer, Encycl. of Chem. Technology, 3rd Edition, Volume 11 (1980), pages 87–89 and Volume 23 (1983), pages 576–607.

The usual blowing agents for polyurethanes are carbon dioxide—which is generated during preparation of polyurethanes from polyisocyanates and compounds containing reactive hydrogen by addition of water—and/or so-called "physical blowing agents", that is to say highly volatile organic substances, such as acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane and chlorohexafluoropropane, and furthermore butane, hexane, heptane or diethyl ether. The usability of fluorinated hydrocarbons for the production of thermally insulating polyurethane foams is known, for example, from DE-C 1 111 381. Inorganic blowing agents, for example air, $CO_2$ or $NO_2$, are also suitable. Further details on the use of blowing agents are described in Kunststoff-Handbuch (Plastics Handbook), Volume VII, Carl-Hanser-Verlag, Munich (1966), for example on pages 108 and 109, 453 to 455 and 507 to 510.

Certain requirements are imposed on physical blowing agents for polyurethane foams. A good miscibility of the blowing agents with the customary raw materials is necessary, but they should be insoluble in the polyurethane formed in order to guarantee a good material quality of the foams. Because of the heat of reaction which occurs during foaming and which can cause an increase in temperature up to about 200° C. during foaming of large-volume components, a good heat stability of the blowing agent is furthermore expected. The blowing agents should moreover preferably be non-combustible. All these requirements have led to the use of fluorinated chlorohydrocarbons (CFCs), in particular trichlorofluoromethane (CFC 11) as physical blowing agents in the course of development of polyurethane foam technology.

However, because of their chlorine content, CFCs have since been suspected of damaging the ozone layer around the earth. It is therefore necessary to abandon the use of these compounds as soon as possible, and to use instead, as physical blowing agents, other substances which have no ozone-damaging potential.

The abandonment of CFCs as blowing agents and insulating gas in favor of $CO_2$ which—as mentioned above—is formed by addition of water during preparation of polyurethanes from polyisocyanates, is discussed. Although this method is acceptable for some foams, it leads to major disadvantages, especially in the case of rigid foams, because the foams produced in this way have an increased thermal conductivity and therefore a lower thermal insulating capacity than the foams produced with the aid of CFCs. German Patent Application P 4 008 042.0 states that fluoroalkanes are suitable in the same way as CFCs for foaming foams based on polyisocyanates and the thermal conductivity of the rigid foams foamed with them is considerably lower than the thermal conductivity of those foamed with $CO_2$. It is also stated there that these fluoroalkanes and $CO_2$ can be used simultaneously as a blowing agent, a considerable improvement in the thermal insulating effect already being achieved at a relatively low content of fluoroalkane (and a correspondingly high $CO_2$ content and therefore a high water content in the rigid foam recipe).

Surprisingly, it has now been found that if branched dodecafluorohexane of the formula $C_6H_2F_{12}$ is used, a particularly large reduction in the thermal conductivity and therefore a particularly great improvement in the thermal insulation, for the same amount of material employed, is achieved compared with the foams foamed with $CO_2$.

The invention relates to a process for the production of foams based on polyisocyanates by reaction of polyisocyanates, compounds having at least two hydrogen atoms which are reactive toward isocyanate groups, blowing agents and if appropriate other additives, which comprises using a blowing agent which consists to the extent of at least 10 mol % of one or more branched dodecafluorohexanes.

Preferably, at least 20 mol %, in particular 50–80 mol %, of the blowing agent consists of at least one branched dodecafluorohexane. However, the blowing agent can in principle also consist of this compound to the extent of 100 mol %.

If, however—and this will generally be the case—the entire blowing agent does not consist of (at least one) dodecafluorohexane, the remainder consists of one of the abovementioned conventional blowing gases, although in this case CFCs will in general be abandoned substantially or completely for the abovementioned reasons. The remainder then preferably consists at least in part of $CO_2$, which is generated by addition of a suitable amount of water during the reaction of the polyisocyanates to give the foams. A "suitable" amount of water here is an amount which generates the desired amount of $CO_2$.

A blowing gas which consists of only at least one branched dodecafluorohexane and $CO_2$ generated by addition of water), that is to say the "remainder" of the blowing gas referred to above consists only of $CO_2$, is particularly preferred.

The preparation of branched dodecafluorohexanes is described in Chemical Abstracts, Volume 100 (25), No. 208713q; Volume 101 (5), No. 37949w; Volume 78 (25), No. 158821p and Volume 67 (19), No. 90380j.

The structural formulae and CAS (Chemical Abstracts System) numbers given there are:

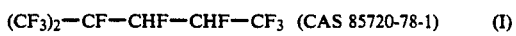

$(CF_3)_2-CF-CHF-CHF-CF_3$ (CAS 85720-78-1)    (I)

-continued

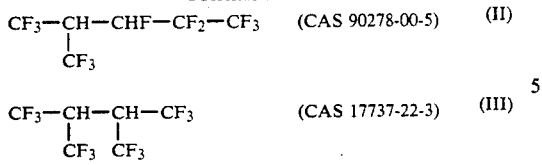

At least one of these three branched dodecafluorohexanes, but in particular (I), is therefore preferably used. However, it cannot be excluded that other isomers will also be formed, at least in small amounts, during preparation of (I) to (III) and will then be contained in (I) to (III). They can be co-used in the process according to the invention.

The invention furthermore relates to foams which are based on polyisocyanates and are obtainable by the above process.

If branched dodecafluorohexanes are used, the foams customary to date can be employed and, as mentioned above, the amounts of water or conventional physical blowing agent can be substantially reduced or even dispensed with completely.

Suitable polyisocyanates for the process according to the invention are the aliphatic, cycloaliphatic or aromatic di- or polyisocyanates customary for this purpose. Tolyl 2,4- and 2,6-diisocyanate, diphenylmethane diisocyanate, polymethylene-polyphenyl isocyanate and mixtures thereof are preferred. It is also possible to use polyisocyanates containing carbodiimide groups, urethane groups, allophanate groups, isocyanurate groups, urea groups or biuret groups, these being called "modified polyisocyanates" and "isocyanate prepolymers".

The polyisocyanates are reacted with compounds which contain at least two hydrogen atoms which are reactive toward isocyanate groups, for example compounds which contain hydroxyl groups and are based on polyethers, polyesters and amines, as well as compounds containing amino and/or carboxyl and/or thiol groups. As a rule, these compounds have 2-8 hydrogen atoms which are reactive toward isocyanates.

Tertiary amines, which can optionally also contain hydrogen atoms which are active toward isocyanate groups, and/or organometallic compounds, preferably tin salts of carboxylic acids, are employed, as is customary, as catalysts in this reaction.

Surface-active additives, such as emulsifiers and foam stabilizers, are in general also co-used. The emulsifiers are, for example, salts of fatty acids.

Polyether-siloxanes are often used as foam stabilizers.

The following examples illustrate the invention. They relate to typical rigid foam recipes.

In the comparison example, the blowing agent 1,1,1,2,2,3,3,4,4-nonafluorohexane ($CF_3-CF_2-CF_2-CF_2-CH_2-CH_3$) is co-used, in addition to the CO, formed from the water.

It is found that if branched dodecafluorohexanes are used, an even lower thermal conductivity compared with unbranched fluorohexane results. This effect even increases further at a longer storage time.

The branched dodecafluorohexanes are also suitable for foaming flexible foams having an open-cell structure and for the production of foamed moldings having a cellular core and compact surface in accordance with DE-AS 1 694 138 (corresponding to GB-PS 1 209 243).

The properties of the foams produced in the examples are shown in the table which follows the examples.

EXAMPLES

Comparison Example (Use of $CO_2$ and nonafluorohexane as a joint blowing agent)

85 g of sucrose/propylene oxide polyether of OH value 380, 15 g of ethylenediamine/propylene oxide polyether of OH value 480, 1 g of foam stabilizer (Type DC 193 from Dow Corning Corp.), 1.5 g of dimethylcyclohexylamine, 3.0 g of water and 15 g of 1,1,1,2,2,3,3,4,4-nonafluorohexane were intimately mixed by means of a stirrer at about 3500 revolutions per second for 15 seconds and the mixture was then intimately mixed with 180 g of crude diphenylmethane diisocyanate (MDI of commercially available quality) for 10 seconds and then poured into a paper mold. Foaming of the mixture started after about 15 seconds and had ended after about 75 seconds. A rigid foam having the properties shown in the table resulted.

Example 1

The procedure was as in the comparison example, but instead of 1,1,1,2,2,3,3,4,4-nonafluorohexane, 18 g of the branched dodecafluorohexane (I) $(CF_3)_2$-CF-CHF-CHF-$CF_3$ according to the invention were used.

Example 2

45 g of sorbitol/glycerol/propylene oxide polyether of OH value 560, 15 g of ethylenediamine/propylene oxide polyether of OH value 480, 20 g of glycerol/propylene oxide polyether of OH value 160, 20 g of tetrabromophthalate diol of OH value 220, 20 g of trichloroethyl phosphate and in each case 1.0 g of the foam stabilizers marketed with the tradenames DC 190 and DC 198 by Dow Corning Corp., 1.0 g of dimethylcyclohexylamine, 2.2 g of water, 28 g of dodecafluorohexane (I) and 137 g of MDI were mixed and foamed as in the above examples.

TABLE

| | | | Properties of the foam | |
| --- | --- | --- | --- | --- |
| | Molar ratio water/fluoro-hexane | Density [kg/m$^3$] | Thermal conductivity [10° C., mW/mK] measured after | |
| | | | 1 day | 6 wks. |
| Comparison example | 75/25 | 38 | 22.1 | 24.8 |
| Example 1 | 75/25 | 38 | 16.7 | 19.1 |
| Example 2 | 57/43 | 40 | 18.0 | 20.0 |

We claim:

1. A process for the production of a foam based on polyisocyanates by reaction of polyisocyanates, compounds having at least two hydrogen atoms which are reactive toward isocyanate groups, blowing agents and optionally other additives, which comprises using a blowing agent which comprises at least 10 mol % of one or more branched dodecafluorohexanes.

2. The process as claimed in claim 1, wherein a blowing agent which comprises at least 20 mol % of one or more branched dodecafluorohexanes is used.

3. The process as claimed in claim 1, wherein a blowing agent which comprises 50-80 mol % of one or more branched dodecafluorohexanes is used.

4. The process as claimed in claim 1, wherein the remainder of the blowing agent comprises $CO_2$, which is formed by addition of water during the reaction of the polyisocyanates.

5. The process as claimed in claim 1, wherein the remainder of the blowing agent consists essentially of $CO_2$, which is formed by addition of water during the reaction of the polyisocyanates.

6. The process as claimed in claim 1, wherein one or more of the branched dodecafluorohexanes of the formulae $$(CF_3)_2-CF-CHF-CHF-CF_3 \quad (I)$$

$$\begin{array}{c} CF_3-CH-CHF-CF_2-CF_3 \\ | \\ CF_3 \end{array} \quad (II)$$

$$\begin{array}{c} CF_3-CH-CH-CF_3 \\ | \quad | \\ CF_3 \quad CF_3 \end{array} \quad (III)$$

is employed.

7. The process as claimed in claim 1, wherein the branched dodecafluorohexane of the formula $$(CF_3)_2-CF-CHF-CHF-CF_3 \quad (I)$$

is employed.

8. A process for the production of a foam derived from the components comprising a polyisocyanate and a compound having at least two hydrogen atoms which are reactive toward isocyante groups, wherein at least part of the blowing of the product obtained from said components is provided by introducing a gaseous blowing agent, said process comprising:

blowing said product with a blowing gas comprising at least 10 mol % of at least one branched dodecafluorohexane.

9. A process as claimed in claim 8, wherein said polyisocyanate and said compound having at least two hydrogen atoms are selected such that the interaction of said polyisocyanate with said compound produces $CO_2$, and wherein the $CO_2$ thus produced participates in said blowing step, at least 20 mol % of the blowing gas being a said branched dodecafluorohexane, and an amount up to the balance of the blowing gas comprising said $CO_2$.

10. A process as claimed in claim 9, wherein the compound having at least two hydrogen atoms is water.

11. A process as claimed in claim 8, wherein at least 50 to 80 mol % of the blowing gas is a said branched dodecafluorohexane.

12. A process as claimed in claim 9, wherein at least 50 to 80 mol % of the blowing gas is a said branched dodecafluorohexane, essentially the balance of the blowing gas consisting essentially of said $CO_2$.

* * * * *